US011820294B2

(12) United States Patent
Biller et al.

(10) Patent No.: US 11,820,294 B2
(45) Date of Patent: Nov. 21, 2023

(54) DOOR ASSEMBLY OF A VEHICLE HAVING A LOUDSPEAKER, AND VEHICLE HAVING A DOOR ASSEMBLY OF THIS TYPE

(71) Applicant: Bayerische Motoren Werke Aktiengesellschaft, Munich (DE)

(72) Inventors: Simon Biller, Erding (DE); Maximilian Caye, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 188 days.

(21) Appl. No.: 17/276,205

(22) PCT Filed: Jul. 29, 2019

(86) PCT No.: PCT/EP2019/070339
§ 371 (c)(1),
(2) Date: Mar. 15, 2021

(87) PCT Pub. No.: WO2020/057815
PCT Pub. Date: Mar. 26, 2020

(65) Prior Publication Data
US 2022/0041114 A1 Feb. 10, 2022

(30) Foreign Application Priority Data
Sep. 17, 2018 (DE) .................... 10 2018 215 732.4

(51) Int. Cl.
*B60R 11/02* (2006.01)
*B60R 11/00* (2006.01)

(52) U.S. Cl.
CPC ... *B60R 11/0217* (2013.01); *B60R 2011/0021* (2013.01)

(58) Field of Classification Search
CPC .................... B60R 11/0217; B60R 2011/0021
(Continued)

(56) References Cited

U.S. PATENT DOCUMENTS 4,572,326 A * 2/1986 Hutchins ............. B60R 11/0217
181/150
4,728,143 A 3/1988 Tanino et al.
(Continued)

FOREIGN PATENT DOCUMENTS

CN 103459205 A 12/2013
CN 107509143 A 12/2017
(Continued)

OTHER PUBLICATIONS

International Search Report (PCT/ISA/210) issued in PCT Application No. PCT/EP2019/070339 dated Sep. 3, 2019 with English translation (five (5) pages).
(Continued)

*Primary Examiner* — Hilary L Gutman
(74) *Attorney, Agent, or Firm* — Crowell & Moring LLP (57) ABSTRACT

A door assembly of a vehicle includes an outer door element, an inner door element, a loudspeaker, and a loudspeaker housing. The loudspeaker housing is arranged in an intermediate space between the inner door element and the outer door element and covers the loudspeaker. The loudspeaker housing also has at least one opening which communicates with the intermediate space, such that the intermediate space can be used as a resonance volume for the loudspeaker.

13 Claims, 6 Drawing Sheets

(58) Field of Classification Search
USPC .................................................. 296/146.1
See application file for complete search history.

(56) References Cited

U.S. PATENT DOCUMENTS

| | | | |
|---|---|---|---|
| 4,790,407 | A | 12/1988 | Yamamoto et al. |
| 5,996,727 | A | 12/1999 | Blind et al. |
| 2001/0038228 | A1 | 11/2001 | Morrison et al. |
| 2007/0154055 | A1 | 7/2007 | Nichols et al. |
| 2014/0029782 | A1* | 1/2014 | Rayner .................. H04R 1/02 |
| | | | 381/386 |
| 2014/0086444 | A1 | 3/2014 | Mueller |
| 2017/0359639 | A1 | 12/2017 | Timo et al. |

FOREIGN PATENT DOCUMENTS

| | | |
|---|---|---|
| DE | 296 14 826 U1 | 11/1996 |
| DE | 297 11 895 U1 | 10/1997 |
| DE | 695 01 389 T2 | 7/1998 |
| DE | 10 2008 021 974 A1 | 11/2009 |
| DE | 20 2011 000 772 U1 | 8/2012 |
| EP | 1 106 439 A2 | 6/2001 |
| EP | 2 119 598 A1 | 11/2009 |
| EP | 2 654 319 A2 | 10/2013 |
| EP | 3 343 942 A1 | 7/2018 |
| JP | 2003-72482 A | 3/2003 |
| WO | WO 2017/037807 A1 | 3/2017 |

OTHER PUBLICATIONS

German-language Written Opinion (PCT/ISA/237) issued in PCT Application No. PCT/EP2019/070339 dated Sep. 3, 2019 (five (5) pages).

German-language Search Report issued in German Application No. 10 2018 215 732.4 dated May 21, 2019 with partial English translation (15 pages).

English translation of Chinese-language Office Action issued in Chinese Application No. 201980058658.9 dated Apr. 29, 2023 (7 pages).

English translation of Chinese-language Office Action issued in Chinese Application No. 201980058658.9 dated Aug. 26, 2023 (6 pages).

* cited by examiner

DOOR ASSEMBLY OF A VEHICLE HAVING A LOUDSPEAKER, AND VEHICLE HAVING A DOOR ASSEMBLY OF THIS TYPE

BACKGROUND AND SUMMARY OF THE INVENTION

The present invention relates to a door assembly of a vehicle having a loudspeaker. A further aspect of the invention relates to a vehicle having a door assembly which has a loudspeaker.

In current door assemblies, loudspeakers are arranged in an intermediate space between the inner door element and an outer door element. In order to generate a sound which can be perceived by the occupants in the passenger compartment of the vehicle, a diaphragm of the loudspeaker is alternately moved forward and backward. This brings about alternating compression and expansion of the air located in front of the diaphragm and therefore produces soundwaves. The diaphragm, which can be composed, for example, of paper, is, however, very thin and for this reason cannot effectively prevent background noise from the outside, such as for example rolling noise of the tires, from entering the passenger compartment of the vehicle. In order to solve this problem, the prior art discloses door assemblies in which the loudspeaker is covered by an enclosed housing. The housing therefore blocks background noise from the outside, which then cannot reach the loudspeaker diaphragm. However, so that the loudspeaker can function acoustically, the enclosed housing must be constructed in a correspondingly large size. Such a housing is associated with high costs and a large amount of expenditure on assembly.

The object of the present invention is therefore to propose a door assembly which has a loudspeaker and which permits the external noise in the passenger compartment of the vehicle to be reduced and makes an optimized method of functioning of the loudspeaker possible without a large amount of expenditure on assembly.

The invention solves this problem through the combination of features of the independent claim.

In particular, the door assembly of a vehicle comprises an outer door element, an inner door element, a loudspeaker, which is arranged on the inner door element, and a loudspeaker housing. In this context, the loudspeaker housing is arranged in an intermediate space between the inner door element and the outer door element and covers the loudspeaker. In addition, the loudspeaker housing has at least one opening which communicates with the intermediate space, so that the intermediate space can be used as a resonance volume for the loudspeaker.

In other words, an interior of the loudspeaker housing communicates with the intermediate space of the loudspeaker housing via the opening of the loudspeaker housing.

In the proposed door assembly, background noise which enters the intermediate space through the door outer element is attenuated and deflected by the loudspeaker housing so that it does not reach the loudspeaker diaphragm at all or reaches it with very low energy. As a result, the input of background noise in the passenger compartment of the vehicle is reduced, so that background noise is hardly perceived by occupants of the vehicle. At the same time, the volume of the intermediate space can be used as a resonance volume by virtue of the at least one opening via which an air space of the loudspeaker housing is connected to an air space of the intermediate space. Since the loudspeaker housing itself does not have to have a large interior, it can be made small. Therefore, the design of the door assembly is facilitated and the costs reduced. Moreover, an optimized acoustic function of the loudspeaker can be achieved without the background noise from the outside.

The term "loudspeaker" is understood within the scope of the invention to mean, in particular, a diaphragm with a drive unit which causes the diaphragm to move.

The formulation "covers the loudspeaker" means, in particular that the part of the loudspeaker which is located in the intermediate space or faces away from the passenger compartment of the vehicle is covered by the loudspeaker housing. The part or the side of the loudspeaker which faces the passenger compartment of the vehicle is, in particular, not covered by the loudspeaker housing, so that a sound generated by the loudspeaker can be perceived in the passenger compartment.

The loudspeaker housing is preferably arranged or mounted on the inner door element.

The loudspeaker is arranged, in particular, in an opening in the inner door element or plugged into the opening in the inner door element so that a sound generated by the loudspeaker can be perceived in the passenger compartment of the vehicle.

The loudspeaker housing is preferably arranged on the inner door element in such a way that in the mounted state the loudspeaker housing encloses a volume (air space) which is connected to the intermediate space via the at least one opening which is provided.

The outer door element and the inner door element are preferably connected to one another.

The outer door element and/or the inner door element are preferably each embodied as sheet metal. In this context, the outer door element is to be understood as being an outer door sheet metal element and the inner door element as being an inner door sheet metal element.

According to one preferred refinement of the invention, the inner door element is embodied in two parts. The one part is advantageously mounted on the other. The one part (first part) is preferably embodied as a sheet metal element (inner door sheet metal element). The other part (second part) is preferably embodied as a lightweight beam made of plastic.

The inner door sheet metal element and the outer door sheet metal element correspond, in combination with one another, in particular to a door shell of the vehicle.

The loudspeaker housing is also referred to as an adapter housing or snorkel within the scope of the invention.

The at least one opening in the loudspeaker housing has a cross section of at least 0.0015 m$^2$, preferably of at least 0.0030 m$^2$, particularly preferably of 0.0045 m$^2$. This optimizes the acoustic behavior of the loudspeaker.

The loudspeaker housing can preferably have a multiplicity of openings which each communicate with the intermediate space. In this context, the sum of the cross sections of all the openings is preferably at least 0.0015 m$^2$, preferably at least 0.0030 m$^2$, particularly preferably 0.0045 m$^2$.

The sum of the cross sections of all the openings is preferably less than 80% of the diaphragm surface area of the loudspeaker.

In addition, the at least one opening is preferably arranged above the loudspeaker, in a direction parallel to a vertical axis of the vehicle. In this way, background noise which propagates upward from below, such as for example rolling noise of the tires, cannot simply pass into the at least one opening. The loudspeaker housing advantageously does not have an opening in the lower area. In other words, the loudspeaker housing is closed from below or in an area underneath the loudspeaker.

The loudspeaker is, in particular, positioned above the center of a wheel/tire, in a direction parallel to a vertical axis of the vehicle, particularly preferably above the highest area of a wheel/tire, of the vehicle.

Furthermore, the at least one opening is arranged in an area of the loudspeaker housing which is opposite the loudspeaker, in a direction parallel to the vertical axis of the vehicle. A background noise therefore has to travel a long distance until it has reached the at least opening at all. This has the advantage of still greater attenuation of the background noise.

The at least one opening is further preferably oriented in such a way that a main component of a normal vector of the at least one opening is parallel to a vertical axis of the vehicle. This ensures that a background noise initially has to be deflected in order to enter the at least one opening. The deflection causes the background noise to lose more energy.

According to an alternative preferred refinement, the at least one opening is oriented in such a way that a main component of a normal vector of the at least one opening is parallel to a longitudinal axis of the vehicle.

Within the scope of the invention, in particular a main component of the normal vector is to be understood as the largest component of the normal vector. The normal vector is directed outward perpendicularly toward the at least one opening.

It is to be noted that the normal vector of the at least opening is to be understood as a normal vector of a hypothetical loudspeaker housing surface at the location of the at least one opening.

Furthermore, the at least one opening is arranged in an area of the loudspeaker housing which faces away from a background noise source of the vehicle. As result, the propagation of a background noise of the background noise source as far as the at least one opening is made more difficult.

"Facing away" means in particular that a minimum distance between the area of the loudspeaker housing and the background noise source is at its largest.

It can also be advantageous if at least one area of a face of the loudspeaker housing which is opposite the outer door element is shaped in such a way that a sound entering the intermediate space through the outer door element can be directed away from the at least one opening.

In particular, the area is inclined in a direction parallel to a vertical axis of the vehicle and/or in a direction toward the outer door element, parallel to a normal vector of the at least one opening.

In this way, a background noise which impacts on the loudspeaker housing is fed back to the outer door element. This has the advantage that the background noise is, on the one hand, directed away from the at least one opening and, on the other hand, is attenuated even more.

The at least one area of the loudspeaker housing particularly preferably adjoins the at least one opening.

In other words, the at least one area of the loudspeaker housing is preferably adjacent to the at least one opening.

The opening also preferably has a first opening and a second opening, wherein the first opening and the second opening are arranged directly opposite one another. As result, background noise which passes into the loudspeaker housing via the first opening and background noise which passes into the loudspeaker housing via the second opening can be attenuated owing to the opposing input direction of one instance of background noise with respect to the other.

"Directly opposite one another" means, in particular, an overlap of at least 80%, preferably of at least 90%, particularly preferably of 100%, of a cross-sectional area of the relatively small opening.

The ratio between the loudspeaker housing volume (interior/air space of the loudspeaker housing) and the intermediate space volume (air space) is preferably less than 1, preferably less than 0.8 and more preferably less than 0.6.

The loudspeaker housing is preferably embodied in such a way that the interior of the loudspeaker housing is bounded by the loudspeaker housing, the loudspeaker and the inner door element, in particular the second part.

In addition, the invention relates to a vehicle with a door assembly as described above.

The vehicle can be, in particular, a motor vehicle.

The vehicle is particularly preferably an electric vehicle. The provision of a door assembly as described above in an electric vehicle is particularly advantageous since the noise level of an electric vehicle is low, in particular in comparison with a motor vehicle, thanks to the quiet electric motors. With the proposed door assembly, background noise from the outside, which is otherwise perceived in a passenger cell of the electric vehicle and would therefore drown out the sound of the loudspeaker is deflected and attenuated.

Further details, features and advantages of the invention emerge from the following description and the figures of exemplary embodiments, wherein identical or functionally identical components are each referred to by the same reference symbol.

DETAILED DESCRIPTION OF THE DRAWINGS

A door assembly 1 of a vehicle 100 according to a first exemplary embodiment of the present invention is subsequently described in detail with reference to FIGS. 1 and 3.

Figure 1:
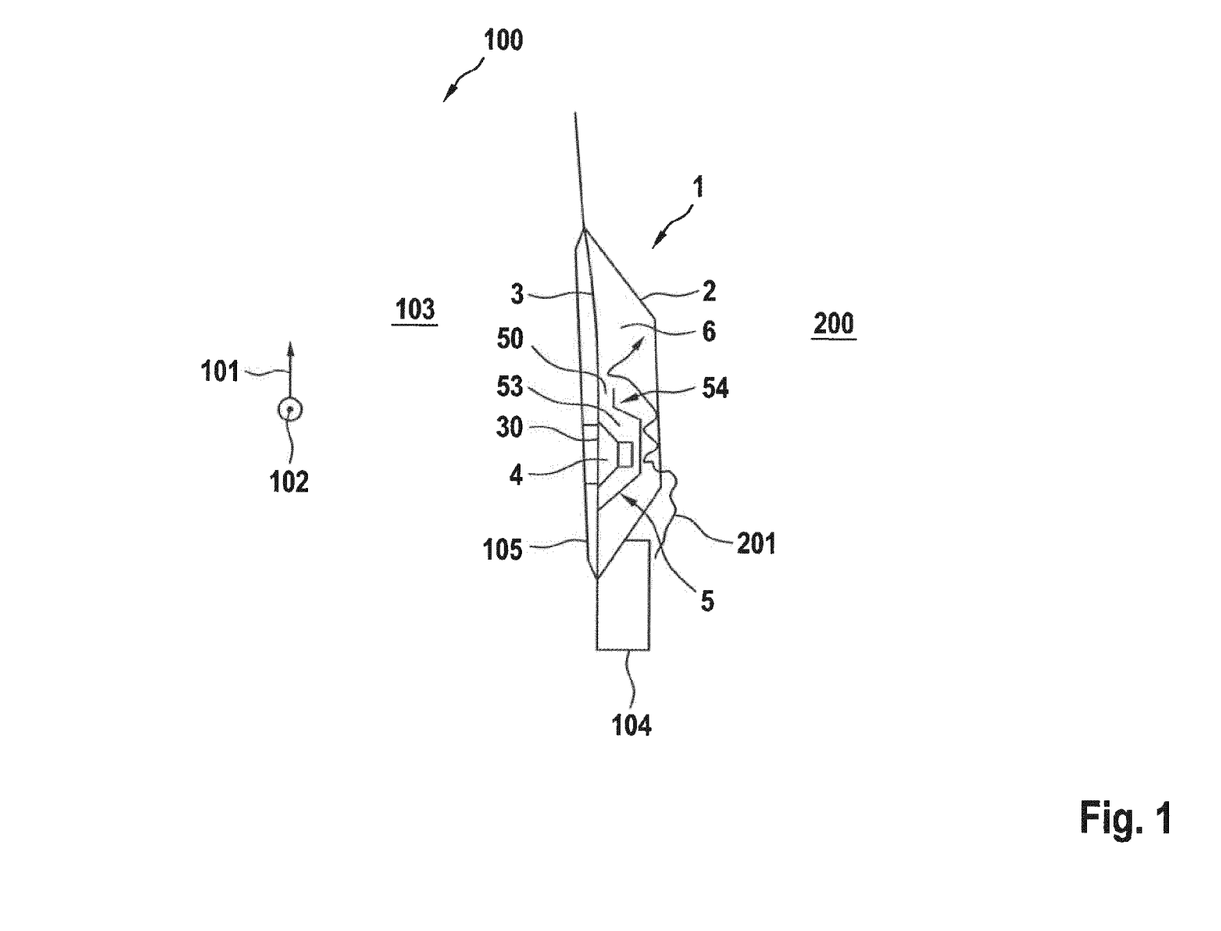
FIG. 1 shows a highly simplified schematic view of a door assembly according to a first exemplary embodiment of the present invention.
Figure 2:
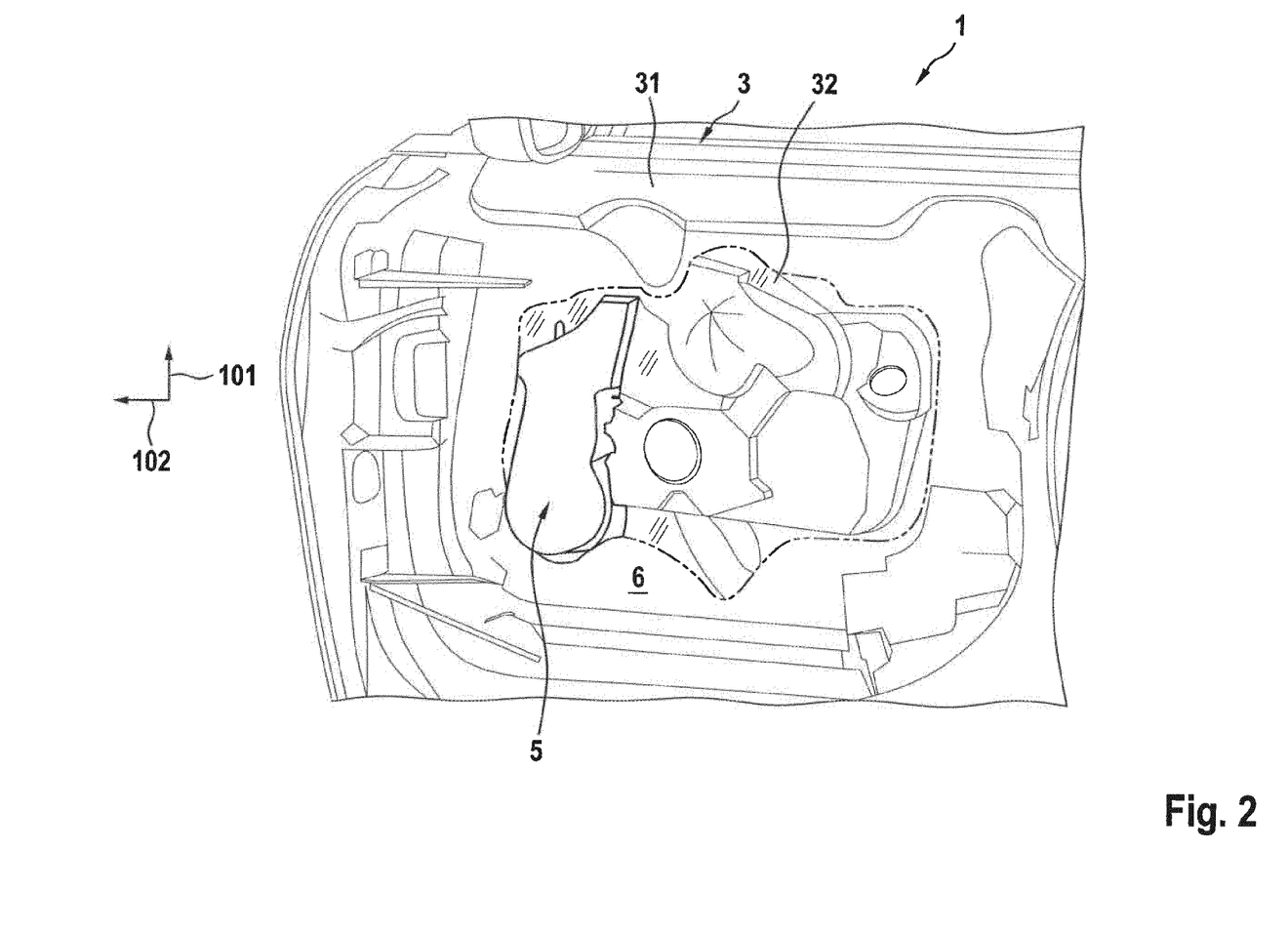
FIG. 2 shows a simplified, schematic perspective view of an area of the door assembly according to the first exemplary embodiment.

FIG. 1 is a schematic view of an area of the vehicle 100 in which the door assembly 1 is provided. The door assembly 1 separates a passenger compartment (passenger cell) 103 of the vehicle 100 from an external space 200. The vehicle 100 can be, for example, a motor vehicle or an electric vehicle.

The door assembly 1 comprises an outer door element 2, an inner door element 3, a loudspeaker 4, which is arranged on the inner door element 3, and a loudspeaker housing 5. FIG. 1 also shows a door lining 105 on the inner door element 3.

The loudspeaker 4 is positioned, in particular, above a tire 104 of the vehicle 100, in a direction parallel to a vertical axis 101 of the vehicle 100.

In the door assembly 1, the loudspeaker housing 5 is arranged in an intermediate space 6 between the inner door element 3 and the outer door element 2. In particular, the loudspeaker housing 5 is provided or mounted on the inner door element 3.

Furthermore, the loudspeaker 4 is, in particular, plugged into an opening 30 in the inner door element 3. A first part of the loudspeaker 4 is therefore located in the intermediate space 6, facing the outer door element 2. A second part of the loudspeaker 4 faces the passenger compartment 103 of the vehicle 100.

The loudspeaker housing 5 covers the loudspeaker 4. This means, in particular, that the part of the loudspeaker 4 which is located in the intermediate space 6, facing the outer door element 2, is covered by the loudspeaker housing 5.

In addition, the loudspeaker housing 5 has an opening 50 which communicates with the intermediate space 6. An interior (air space) 53 of the loudspeaker housing 5 is therefore connected to the intermediate space 6. As a result, the intermediate space 6 serves as a resonance volume for the loudspeaker 4, which is therefore embodied as a woofer.

In addition, a background noise 201 which comes from the outside, such as for example a rolling noise of the tire 104, can be deflected and attenuated by the loudspeaker housing 5.

The opening 50 is arranged in an area 54 of the loudspeaker housing 5 which faces away from the tire 104 which acts as a background noise source. As a result, the propagation of the background noise 201, caused by the tire 104, as far as the opening 50 is made more difficult.

The area 54 of the loudspeaker housing 5 in which the opening 50 is arranged is opposite the loudspeaker 4, in a direction parallel to the vertical axis 101 of the vehicle 100. Therefore, the background noise 201 must cover a long distance until it reaches the opening 50 at all. The longer the distance up to the opening 50, the more the energy, and therefore the pressure of the background noise wave, are reduced.

In particular, the opening 50 is arranged above the loudspeaker 4, in a direction parallel to the vertical axis 101 of the vehicle 100. Therefore, background noise which propagates upward from below, such as for example rolling noise of the tire 104, cannot easily pass into the opening 50.

The loudspeaker housing 5 does not have an opening in the lower area in which the loudspeaker 4 is positioned.

FIG. 2 shows a perspective illustration of an area of the door assembly 1 when viewed from outside (the direction from the exterior space 200 to the passenger compartment 103 of the vehicle). For the purposes of illustration, the outer door element 2 has been removed in FIG. 2.

As is apparent from FIG. 2, the inner door element 3 has a first part 31 and a second part 32. In particular, the first part 31 is embodied as a sheet metal element, wherein the second part 32 is embodied as a lightweight beam made of plastic. The second part 32 is applied to the first part 31 and connected to the first part 31.

It is also apparent from FIG. 2 that the loudspeaker housing 5 is provided on the second part.

Figure 3:
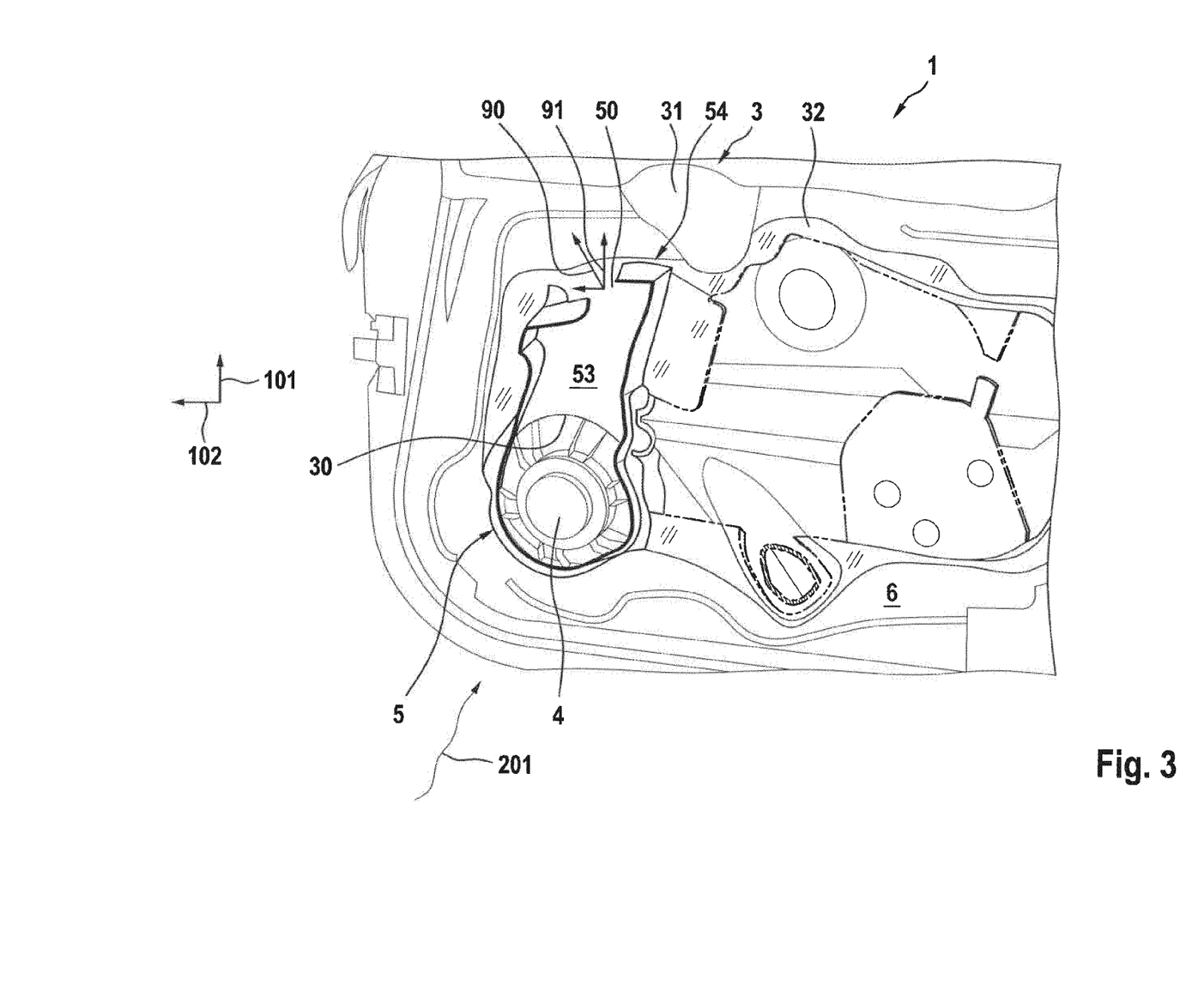
FIG. 3 shows a simplified, schematic sectional view through part of the area of the door assembly in FIG. 2.

In order to acquire a better impression of the design of the loudspeaker housing 5, FIG. 3 illustrates part of the area of the door assembly 1 from FIG. 2 in section.

In this context it is apparent that the opening 50 in the loudspeaker housing 5 is oriented in such a way that a main component 91 of a normal vector 90 of the opening 50 is parallel to the vertical axis 101 of the vehicle 100. This ensures that the background noise 201 firstly has to be deflected, in particular approximately by 180°, in order to pass into the interior 53 of the loudspeaker housing 5 via the opening 50. The energy of the background noise 201 is reduced even further by the deflection.

The opening 50 in the loudspeaker housing 5 has a cross section of at least 0.0015 m$^2$, preferably of at least 0.0030 m$^2$, particularly preferably of 0.0045 m$^2$. The intermediate space 6 is therefore optimally used as a resonance space of the loudspeaker 5.

It is also apparent from FIG. 3 that the opening 30 in which the loudspeaker 4 is arranged is formed in the second part 32.

Figure 4:
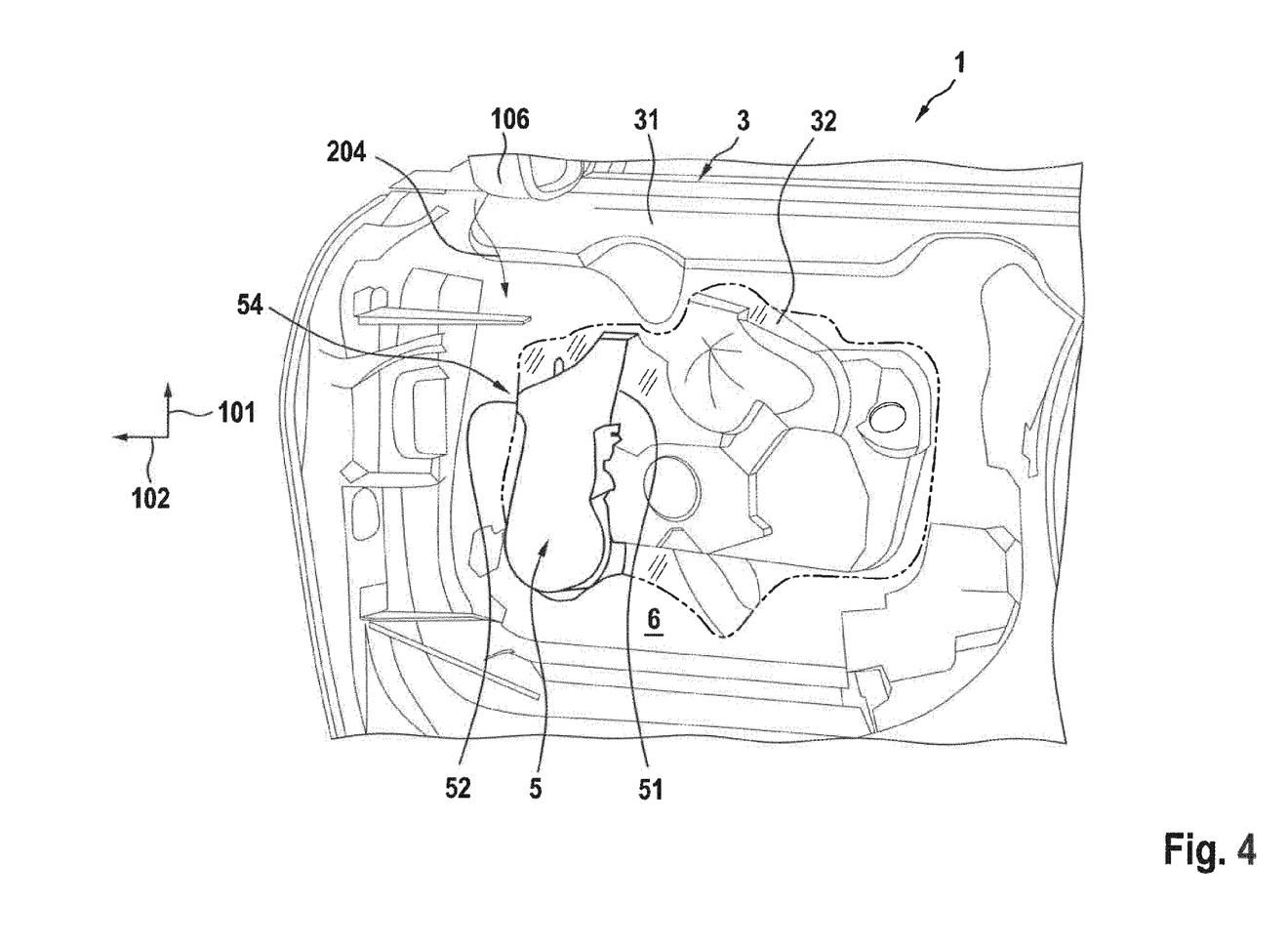
FIG. 4 shows a simplified, schematic perspective view of an area of the door assembly according to a second exemplary embodiment.

In the text which follows, a door assembly according to a second exemplary embodiment of the present invention is described with reference to FIGS. 4 to 6.

The door assembly 1 according to the second exemplary embodiment differs from that according to the first exemplary embodiment basically in respect of the number of openings provided in the loudspeaker housing 5 and their arrangement.

The loudspeaker housing 5 of the door assembly according to the second exemplary embodiment therefore has a first opening 51 and a second opening 52.

Figure 5:
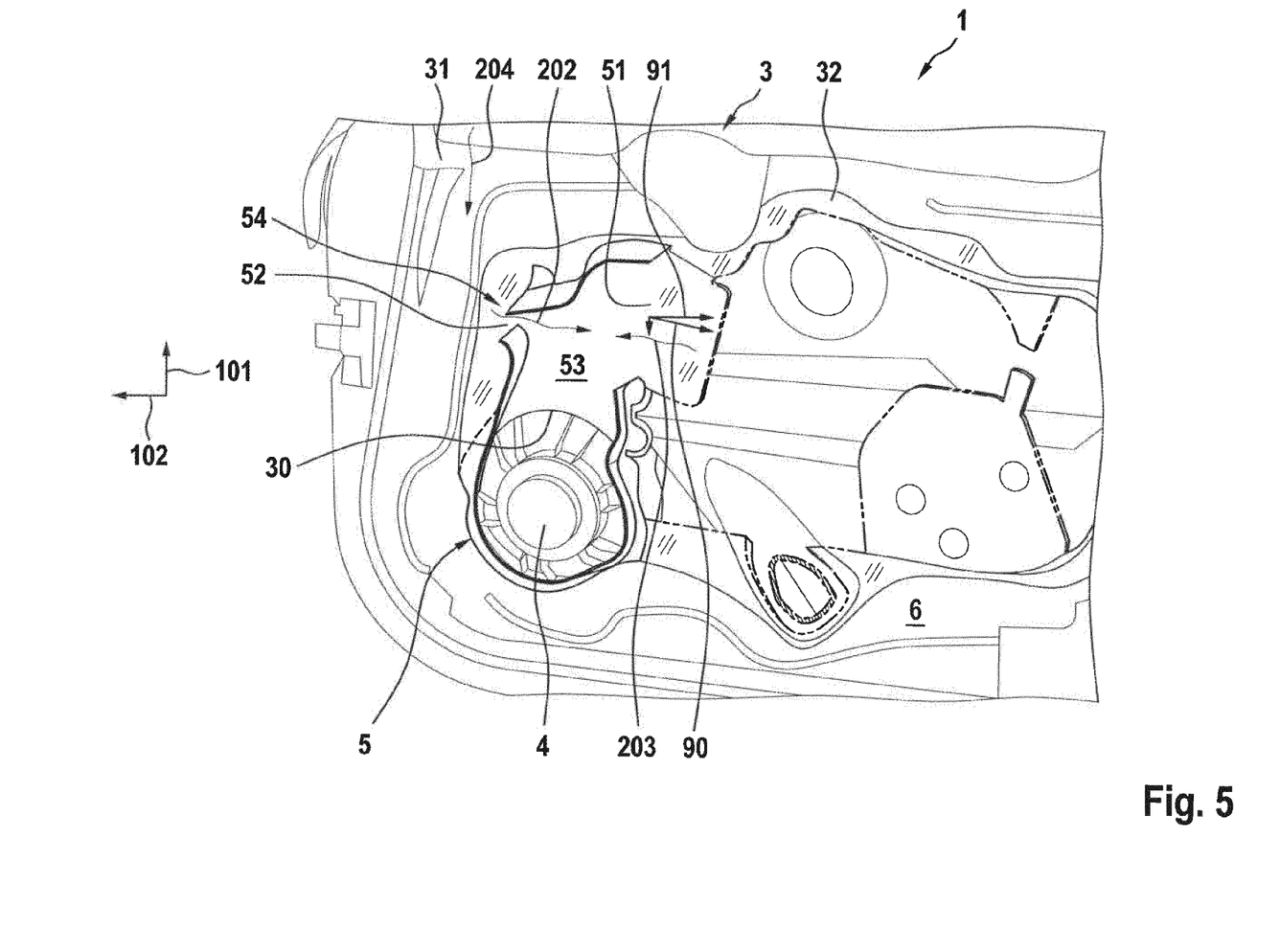
FIG. 5 shows a simplified, schematic sectional view through part of the area of the door assembly in FIG. 4.

The first opening 51 and the second opening 52 are arranged directly opposite one another (FIG. 5). Owing to this arrangement, background noise 202, 203 enters the interior 53 of the loudspeaker housing in opposite directions. Therefore, the instances of background noise 202, 203 can be attenuated with respect to one another.

"Directly opposite one another" means in this case an overlap of 100% of a cross section area of the second opening 52 with the first opening 51 in a direction parallel to the vertical axis 101 of the vehicle 100. The first opening 51 has a larger cross section than the second opening 52.

In addition, the sum of the cross sections of the first opening 51 and of the second opening 52 is at least 0.0015 m$^2$, preferably at least 0.0030 m$^2$, particularly preferably 0.0045 m$^2$.

In particular the two openings 51, 52 are arranged above the loudspeaker 4, in a direction parallel to the vertical axis 101 of the vehicle 100.

In contrast to the opening 50 in the loudspeaker housing 5 according to the first exemplary embodiment, the first opening 51 and the second opening 52 are not formed here in an area of the loudspeaker housing 5 which is opposite the loudspeaker 4 but rather on the sides of the loudspeaker 4, in a direction parallel to the longitudinal axis 102 of the vehicle 100.

In addition, both the first opening 51 and the second opening 52 are oriented in such a way that a main component 91 of a normal vector 90 of the respective opening is parallel to the longitudinal axis 102 of the vehicle 100. However, to provide a better overview only the normal vector of the first opening 51 with its components is shown in FIG. 5.

This arrangement of the first opening 51 and of the second opening 52 can furthermore also prevent the penetration of a background noise 204 which occurs around an exterior rear view mirror 106 of the vehicle 100 as result of the aerodynamic effects.

The first opening 51 and the second opening 52 are each arranged in an area 54 of the loudspeaker housing 5 which faces away from the tire 104 which acts as a main source of background noise for the loudspeaker 4. In addition, the area of the loudspeaker housing 5 in which the first opening 51 is formed also faces the exterior rear view mirror 106. The exterior rear view mirror 106 acts as a secondary source of background noise for the loudspeaker 4.

Figure 6:
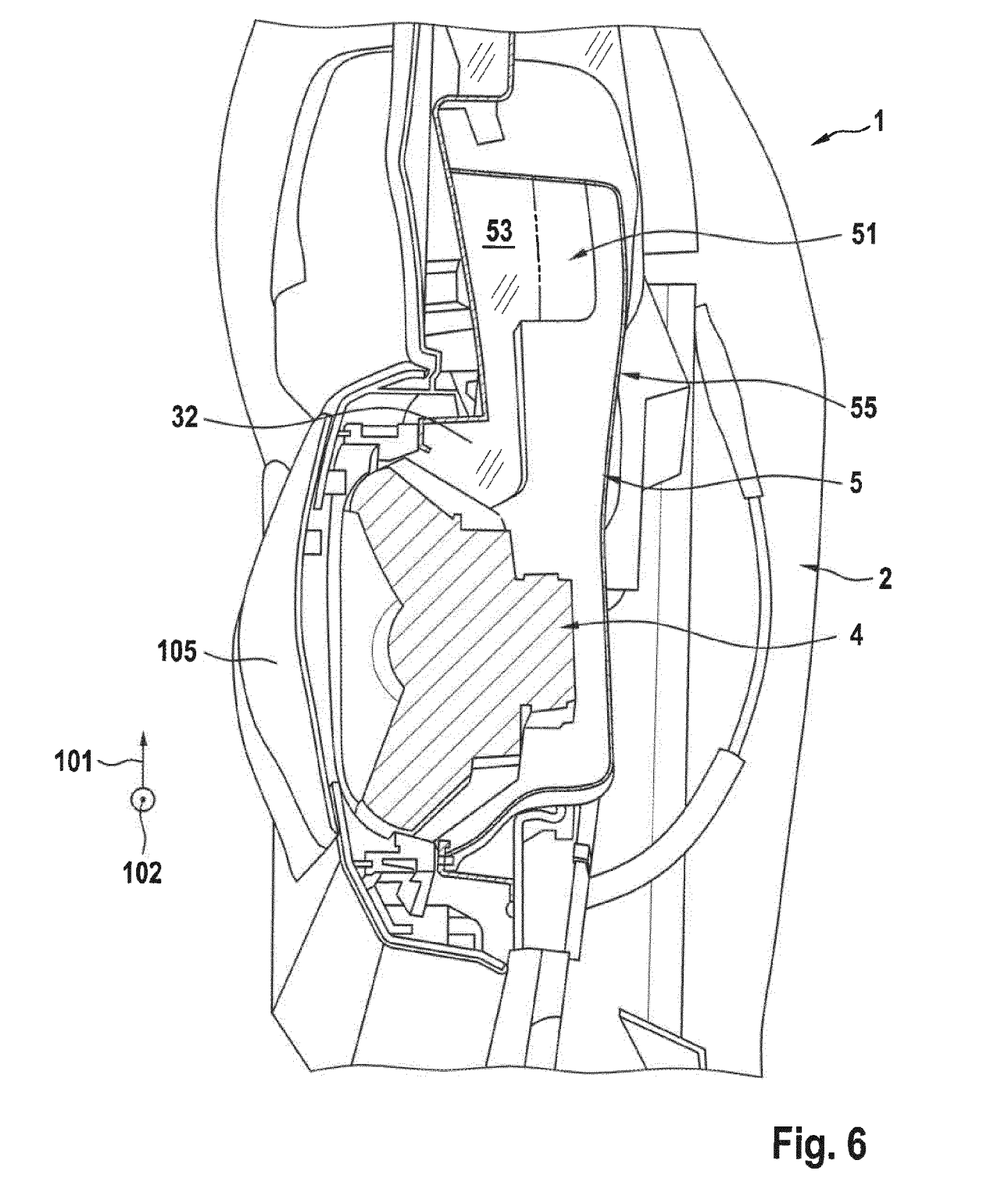
FIG. 6 shows a simplified, schematic further sectional view through part of the area of the door assembly in FIG. 4.

It is also apparent from FIG. 6 that an area 55 of a face of the loudspeaker housing 5 which is opposite the outer door element 2 is shaped in such a way that a sound entering the intermediate space 6 through the outer door element 2 can be conducted away from the second opening 52.

In particular, the area 55 is inclined with respect to the outer door element 2. The area 55 of the loudspeaker housing 5 advantageously adjoins the second opening 52.

Background noise which impinges on the loudspeaker housing 5 is therefore conducted back to the outer door element 2. This has the advantage that the background noise, or at least part thereof, is directed away from the second opening 52 and at the same time attenuated further.

LIST OF REFERENCE NUMBERS

1 Door assembly
2 Outer door element
3 Inner door element
4 Loudspeaker
5 Loudspeaker housing
6 Intermediate space
30 Opening in inner door element
31 First part of inner door element
32 Second part of inner door element
50 Opening in loudspeaker housing
51 First opening in loudspeaker housing
52 Second opening in loudspeaker housing
53 Interior (air space) of the loudspeaker housing
54 Area of loudspeaker housing
55 Area of loudspeaker housing
90 Normal vector of opening
91 Main component of opening
100 Vehicle
101 Vertical axis of vehicle
102 Longitudinal axis of vehicle
103 Passenger compartment/passenger cell of vehicle
104 Tire
105 Door lining
106 Exterior rear view mirror
200 Space outside vehicle
201 Background noise
202 Background noise
203 Background noise
204 Background noise

What is claimed is:

1. A door assembly of a vehicle, comprising:
an outer door element;
an inner door element;
a loudspeaker which is arranged on the inner door element; and
a loudspeaker housing which is arranged in an intermediate space between the inner door element and the outer door element and covers the loudspeaker,
wherein the loudspeaker housing comprises
a portion of the inner door element which extends away from the inner door element so as to surround the loudspeaker on one end and define an elongated passageway on an other end, wherein
the elongated passageway has at least one opening which communicates with the intermediate space, so that the intermediate space forms a resonance volume for the loudspeaker, and
a portion of the outer door element which in connection with the portion of the inner door element encloses the loudspeaker.

2. The door assembly according to claim 1, wherein the at least one opening has a cross sectional area of at least 0.0015 m2.

3. The door assembly according to claim 1, wherein the at least one opening has a cross sectional area of at least 0.0030 m2.

4. The door assembly according to claim 1, wherein the at least one opening has a cross sectional area of approximately 0.0045 m2.

5. The door assembly according to claim 1, wherein the at least one opening is arranged above the loudspeaker, in a direction parallel to a vertical axis of the vehicle.

6. The door assembly according to claim 5, wherein the at least one opening is arranged in an area of the loudspeaker housing which is opposite the loudspeaker, in the direction parallel to the vertical axis of the vehicle.

7. The door assembly according to claim 1, wherein the at least one opening is oriented such that a main component of a normal vector of the at least one opening is parallel to a vertical axis of the vehicle.

8. The door assembly according to claim 1, wherein the at least one opening is oriented such that a main component of a normal vector of the at least one opening is parallel to a longitudinal axis of the vehicle.

9. The door assembly according to claim 1, wherein the at least one opening is arranged in an area of the loudspeaker housing which faces away from a background noise source of the vehicle.

10. The door assembly according to claim 1, wherein at least one area of a face of the loudspeaker housing which is opposite the outer door element is shaped such that a sound entering the intermediate space through the outer door element is directed away from the at least one opening.

11. The door assembly according to claim 10, wherein the at least one area adjoins the at least one opening.

12. The door assembly according to claim 1, wherein the at least one opening has a first opening and a second opening, and
the first opening and the second opening are arranged directly opposite one another.

13. A vehicle comprising a door assembly according to claim 1.

* * * * *